US010952260B1

(12) United States Patent
Selvaganapathy et al.

(10) Patent No.: US 10,952,260 B1
(45) Date of Patent: Mar. 16, 2021

(54) ENHANCEMENTS FOR CONTENTION BASED SHARED PRECONFIGURED UPLINK RESOURCE MECHANISM WITH ADDITIONAL RESOURCE ALLOCATION FOR RETRANSMISSIONS

(71) Applicant: Nokia Technologies Oy, Espoo (FI)

(72) Inventors: Srinivasan Selvaganapathy, Nagar (IN); Nitin Mangalvedhe, Hoffman Estates, IL (US); Rapeepat Ratasuk, Hoffman Estates, IL (US); Ryan Keating, Chicago, IL (US)

(73) Assignee: Nokia Technologies Oy, Espoo (FI)

( * ) Notice: Subject to any disclaimer, the term of this patent is extended or adjusted under 35 U.S.C. 154(b) by 9 days.

(21) Appl. No.: 16/570,471

(22) Filed: Sep. 13, 2019

(51) Int. Cl.
| | | |
|---|---|---|
| *H04W 74/08* | (2009.01) |
| *H04W 76/11* | (2018.01) |
| *H04W 72/04* | (2009.01) |
| *H04L 5/00* | (2006.01) |
| *H04W 76/27* | (2018.01) |
| *H04W 72/14* | (2009.01) |
| *H04W 24/08* | (2009.01) |
| *H04W 80/08* | (2009.01) |

(52) U.S. Cl.
CPC ....... *H04W 74/0866* (2013.01); *H04L 5/0055* (2013.01); *H04W 24/08* (2013.01); *H04W 72/042* (2013.01); *H04W 72/0466* (2013.01); *H04W 72/14* (2013.01); *H04W 76/11* (2018.02); *H04W 76/27* (2018.02); *H04W 80/08* (2013.01)

(58) Field of Classification Search
None
See application file for complete search history.

(56) References Cited

U.S. PATENT DOCUMENTS

| | | | |
|---|---|---|---|
| 9,131,502 B2* | 9/2015 | Li | H04W 74/0866 |
| 2020/0014495 A1* | 1/2020 | Niu | H04L 1/188 |
| 2020/0092905 A1* | 3/2020 | Vos | H04W 72/14 |

OTHER PUBLICATIONS

Nokia. "Transmission in Preconfigured UL Resources" 3GPP TSG-RAN WG1 Meeting #97 R1-1906702, May 13-17, 2019.
(Continued)

*Primary Examiner* — Anh Ngoc M Nguyen
(74) *Attorney, Agent, or Firm* — Harrington & Smith

(57) ABSTRACT

Methods, apparatuses, and computer program products are disclosed for contention based shared preconfigured uplink resource configuration. An example method includes receiving an assignment of contention based shared preconfigured uplink resources; receiving an assignment of a common radio network temporary identifier for monitoring downlink control information indicating a negative acknowledgement for contention based shared transmission, and a dedicated radio network temporary identifier for monitoring downlink control information indicating an acknowledgement of transmission of uplink data; transmitting the uplink data using a physical uplink shared channel allocated for the contention based shared preconfigured uplink resource transmission; in response to the downlink control information indicating the negative acknowledgement and uplink grants for multiple physical uplink shared channel resources, retransmitting the uplink data on a selected one of the received uplink grants; and in response to the downlink control information indicating the acknowledgment, not retransmitting the uplink data.

28 Claims, 5 Drawing Sheets

(56) References Cited

OTHER PUBLICATIONS

Qualcomm Incorporated; "Support for transmission in preconfigured UL resources"; R1-1908835; 3GPP TSG RAN WG1 Meeting #98; Prague, Czech Republic; Aug. 26-30, 2019; whole document (7 pages).
Sierra Wireless; "Pre-configured UL Resources Design Considerations"; R2-1817940; 3GPP TSG RAN WG2 Meeting #104; Spokane. USA; Nov. 12-16, 2018; whole document (9 pages).
Sony; "Consideration on Pre-configured Uplink Resource"; R1-1812754; 3GPP TSG RAN WG1 Meeting #95; Spokane, USA; Nov. 12-16, 2018; whole document (6 pages).

* cited by examiner

ENHANCEMENTS FOR CONTENTION BASED SHARED PRECONFIGURED UPLINK RESOURCE MECHANISM WITH ADDITIONAL RESOURCE ALLOCATION FOR RETRANSMISSIONS

BACKGROUND

Technical Field

The example and non-limiting embodiments relate generally to communications and, more particularly, to enhancements for contention based shared preconfigured uplink resource (CBS PUR) mechanism with additional resource allocation for retransmissions.

Brief Description of Prior Developments

It is known to schedule resources between a mobile terminal and a base station in a communication system.

SUMMARY

The following summary is merely intended to be an example. The summary is not intended to limit the scope of the claims.

In accordance with an aspect, a method includes receiving an assignment of contention based shared preconfigured uplink resources via radio resource control signaling; receiving an assignment of a common radio network temporary identifier for monitoring downlink control information indicating a negative acknowledgement for contention based shared transmission, and a dedicated radio network temporary identifier for monitoring downlink control information indicating an acknowledgement of transmission of uplink data; transmitting the uplink data during a contention based shared preconfigured uplink resource transmission using a physical uplink shared channel allocated for the contention based shared preconfigured uplink resource transmission; in response to the downlink control information indicating the negative acknowledgement and uplink grants for multiple physical uplink shared channel resources, retransmitting the uplink data on a selected one of the received uplink grants for multiple physical uplink shared channel resources; and in response to the downlink control information indicating the acknowledgment, not retransmitting the uplink data.

In accordance with an aspect, a method includes configuring an assignment of contention based shared preconfigured uplink resources via radio resource control signaling for multiple user equipments; attempting to decode the contention based shared preconfigured uplink resources; in response to detecting a collision between transmissions within the contention based shared preconfigured uplink resources, transmitting the downlink control information indicating a negative acknowledgement with a common radio network temporary identifier and uplink grants for multiple physical uplink shared channel resource allocations for retransmission, and decoding the multiple physical uplink shared channel resource allocations; and in response to the transmitted uplink data being successfully decoded from at least one of the multiple user equipments within the assigned contention based shared resources, transmitting the downlink control information indicating an acknowledgement with a dedicated radio network temporary identifier.

In accordance with an aspect, an apparatus includes at least one processor; and at least one non-transitory memory including computer program code, the at least one memory and the computer program code configured to, with the at least one processor, cause the apparatus to: receive an assignment of contention based shared preconfigured uplink resources via radio resource control signaling; receive an assignment of a common radio network temporary identifier for monitoring downlink control information indicating a negative acknowledgement for contention based shared transmission, and a dedicated radio network temporary identifier for monitoring downlink control information indicating an acknowledgement of transmission of uplink data; transmit the uplink data during a contention based shared preconfigured uplink resource transmission using a physical uplink shared channel allocated for the contention based shared preconfigured uplink resource transmission; in response to the downlink control information indicating the negative acknowledgement and uplink grants for multiple physical uplink shared channel resources, retransmit the uplink data on a selected one of the received uplink grants for multiple physical uplink shared channel resources; and in response to the downlink control information indicating the acknowledgment, not retransmit the uplink data.

In accordance with an aspect, an apparatus includes at least one processor; and at least one non-transitory memory including computer program code, the at least one memory and the computer program code configured to, with the at least one processor, cause the apparatus to: configure an assignment of contention based shared preconfigured uplink resources via radio resource control signaling for multiple user equipments; attempt to decode the contention based shared preconfigured uplink resources; in response to detecting a collision between transmissions within the contention based shared preconfigured uplink resources, transmit the downlink control information indicating a negative acknowledgement with a common radio network temporary identifier and uplink grants for multiple physical uplink shared channel resource allocations for retransmission, and decode the multiple physical uplink shared channel resource allocations; and in response to the transmitted uplink data being successfully decoded from at least one of the multiple user equipments within the assigned contention based shared resources, transmit the downlink control information indicating an acknowledgement with a dedicated radio network temporary identifier.

In accordance with an aspect, a non-transitory program storage device readable by a machine, tangibly embodying a program of instructions executable by the machine for performing operations is described, the operations comprising: receiving an assignment of contention based shared preconfigured uplink resources via radio resource control signaling; receiving an assignment of a common radio network temporary identifier for monitoring downlink control information indicating a negative acknowledgement for contention based shared transmission, and a dedicated radio network temporary identifier for monitoring downlink control information indicating an acknowledgement of transmission of uplink data; transmitting the uplink data during a contention based shared preconfigured uplink resource transmission using a physical uplink shared channel allocated for the contention based shared preconfigured uplink resource transmission; in response to the downlink control information indicating the negative acknowledgement and uplink grants for multiple physical uplink shared channel resources, retransmitting the uplink data on a selected one of the received uplink grants for multiple physical uplink shared channel resources; and in response to the downlink control information indicating the acknowledgment, not retransmitting the uplink data.

In accordance with an aspect, a non-transitory program storage device readable by a machine, tangibly embodying a program of instructions executable by the machine for performing operations is described, the operations comprising: configuring an assignment of contention based shared preconfigured uplink resources via radio resource control signaling for multiple user equipments; attempting to decode the contention based shared preconfigured uplink resources; in response to detecting a collision between transmissions within the contention based shared preconfigured uplink resources, transmitting the downlink control information indicating a negative acknowledgement with a common radio network temporary identifier and uplink grants for multiple physical uplink shared channel resource allocations for retransmission, and decoding the multiple physical uplink shared channel resource allocations; and in response to the transmitted uplink data being successfully decoded from at least one of the multiple user equipments within the assigned contention based shared resources, transmitting the downlink control information indicating an acknowledgement with a dedicated radio network temporary identifier.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Figure 1:
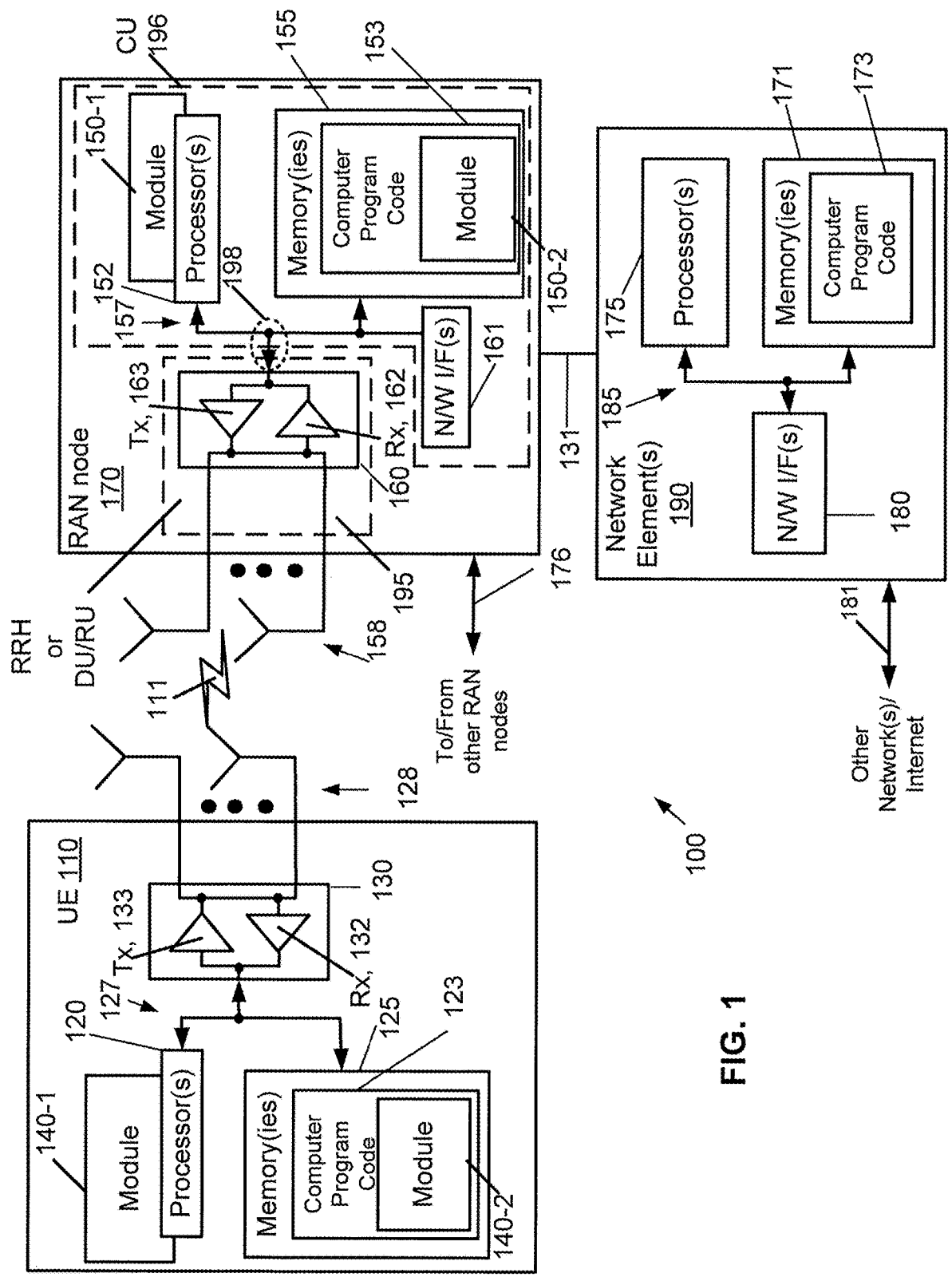
FIG. 1 is a block diagram of one possible and non-limiting exemplary system in which the exemplary embodiments may be practiced.

The following abbreviations that may be found in the specification and/or the drawing figures are defined as follows:
3GPP third generation partnership project
5G fifth generation
5GC 5G core network
ACK acknowledgement
BWP bandwidth part
AMF access and mobility management function
CBS contention based shared
CFS contention free shared
C-RNTI cell radio network temporary identifier
CU central unit
DCI downlink control information
D-PUR dedicated PUR
DU distributed unit
DSP digital signal processor
EDT early data transmission
eMBB enhanced mobile broadband
eMTC enhanced machine type communication
eNB (or ENB or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
FDMA frequency-division multiple access
gNB (or gNodeB) base station for 5G/NR, i.e., a node providing NR user plane and control plane protocol terminations towards the UE, and connected via the NG interface to the 5GC
HARQ hybrid automatic repeat request
ID (or id) identification
IoT or IOT internet of things
I/F interface
LTE long term evolution
MAC medium access control
MME mobility management entity
MTC machine type communications
NACK negative acknowledgement
NB-IoT narrowband IoT
ng or NG new generation
ng-eNB or NG-eNB new generation eNB
NOMA non-orthogonal multiple access area
NR new radio
N/W or NW network
PDA personal digital assistant
PDCCH physical downlink control channel
PDCP packet data convergence protocol
PDU protocol data unit
PHY physical layer
PUR preconfigured uplink resource
PUSCH physical uplink shared channel
RACH random access channel
RAN radio access network
RAN1, RAN2, or RAN4 RAN meeting
Rel release
RLC radio link control
RNTI radio network temporary identifier
RRH remote radio head
RRC radio resource control
RP 3GPP RAN
RU radio unit
Rx receiver
SC-FDMA single-carrier FDMA
SDAP service data adaptation protocol
SGW serving gateway
SMF session management function
TBS transport block size
Tx transmitter
UE user equipment (e.g., a wireless, typically mobile device)
UL uplink (e.g., from the UE toward the network)
UPF user plane function
URLLC ultra-reliable low-latency communication
WI work item Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting radio resource control (RRC), SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN node 170 is coupled via a link 131 to the network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Examples described herein relate to Preconfigured Uplink Resource (PUR) for NR or LTE. The examples provide a scheme to enable contention based shared PUR for NR or LTE and the fallback mechanisms for contention resolution. In particular, the examples suggest need-based additional resource grants for UE failing the initial attempt if the gNB or eNB detects collision so as to reduce UEs failing in contention resolution. The examples may be adapted to 4G or 5G standards.

The examples relate to PUR for NR or LTE. A feature for NR-light is PUR, or grant-free uplink transmission. The UE may be configured with idle-mode or inactive-mode PUR while in RRC connected mode.

In LTE, only dedicated PUR in idle mode is supported. Dedicated PUR works well for cases where the data traffic is periodic, but is not well suited for bursty or aperiodic traffic.

Sharing of PUR resources may be one feature to allow multiple IoT devices which have bursty traffic to make reports while remaining in an idle or inactive state which saves the UE power consumption. However, if PUR resources are no longer dedicated to a single UE there needs to be a contention resolution process. In particular if a UE uses any contention based shared PUR resources but is unsuccessful then a fallback method needs to be defined.

Features provided by the examples described herein is how to enable transmission in contention based shared PUR for NR or LTE.

The examples described herein include a proposed scheme to support transmission in contention based shared preconfigured uplink resource (CBS PUR) for NR-Light devices and the fallback mechanisms needed for the contention resolution.

The examples described herein indicate that for the first transmission, the base station (e.g., gNB for 5G NR or eNB for LTE) allocates a single PUR for multiple UE to access. In case the base station (e.g., eNB or gNB) detects collision, in the next possible scheduling period it indicates via DCI more PUSCH resources for the competing UE to split between them to avoid retransmission failure. This mechanism of allocating multiple grants in retransmission to reduce the impact of collision is an aspect.

For example, in case of more than one UE attempting for allocated resources for CBS PUR, instead of failing them in contention resolution and all of them attempting via RACH or EDT in this case, the examples suggest, for the UE failing the initial attempt, providing the UE with second dynamic additional CBS-PUR resources for the UE to succeed in subsequent transmissions. The additional resource allocation described is based on need, instead of overbooking more occasions for CBS PUR or dedicated PUR. The number of additional resource allocation is configurable.

In Rel-17, NR-Light (also referred to as NR-based IoT or NR-Light) addresses use cases that may not be met by NR eMBB, URLLC or eMTC/NB-IoT. NR-Light supports the following requirements:

Higher data rate & reliability and lower latency than eMTC & NB-IoT

Lower cost/complexity and longer battery life than NR eMBB

Wider coverage than eMBB

Specifically, NR-Light addresses the following objectives and use cases—

Figure 2:
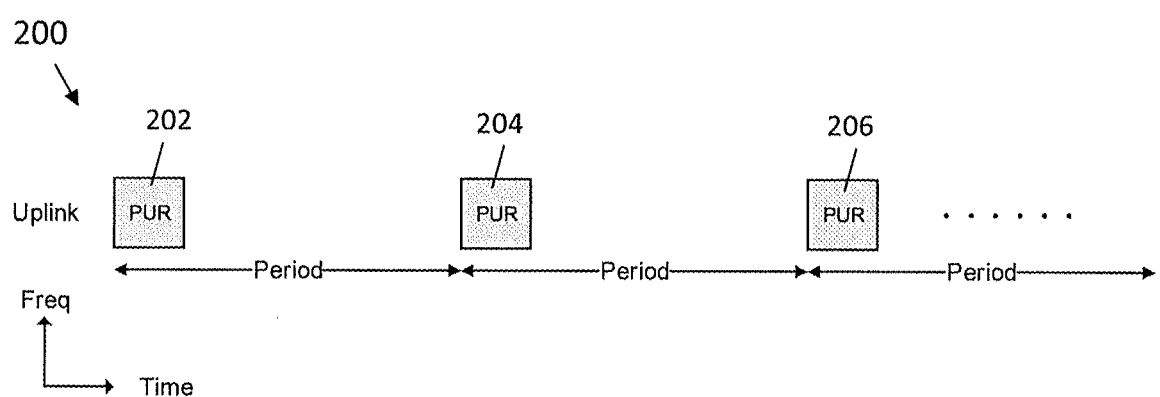
FIG. 2 is a diagram illustrating preconfigured uplink resources.

Moderate data rates up to [100] Mbps to support e.g. live video feed, visual production control, process automation Moderate latency of around [10-30] ms to support e.g. remote drone operation, cooperative farm machinery, time-critical sensing and feedback, remote vehicle operation Low complexity device with module cost comparable to LTE Coverage enhancement of [10-15] dB compared to eMBB Low power consumption with battery life [2-4X] longer than eMBB Positioning accuracy of [30 cm-1 m] to support e.g. indoor asset tracking, coordinated vehicle control, remote monitoring A feature for NR-Light is transmission in Preconfigured Uplink Resource (PUR), or grant-free uplink transmission. The UE may be configured with idle-mode or inactive-mode PUR while in RRC connected mode prior to moving to the idle or inactive mode. FIG. 2 is a diagram 200 illustrating preconfigured uplink resources 202, 204, and 206.

In addition, eMTC and NB-IoT may also continue to see further improvements in Rel-17. Thus, contention based shared PUR may also be supported in LTE.

As part of the Rel-16 enhancements of eMTC and NB-IoT (work items RP-181450 and RP-181451), one of the objectives of both WIs is—

Specify support for transmission in preconfigured resources in idle and/or connected mode based on SC-FDMA waveform for UEs with a valid timing advance [RAN1, RAN2, RAN4]
Both shared resources and dedicated resources can be discussed
Note: This may be limited to orthogonal (multi) access schemes In LTE, only dedicated preconfigured uplink resource (PUR) in idle mode is supported. Dedicated means that a unique or dedicated time-frequency resource is reserved for each UE configured with PUR. This also means that PUR transmission is contention-free as only one UE is allocated the time/frequency resources.

In Rel-17, NR-Light (also referred to as NR-based IoT or NR-Light) addresses use cases that cannot be met by NR eMBB, URLLC or eMTC/NB-IoT. One goal of NR-Light is to support Industrial IoT deployment using low-cost, low-complexity devices with long battery life. To provide support for low-cost preconfigured uplink resources (PURs) may be introduced. Dedicated PUR works well for cases where the data traffic is periodic, but is not well suited for bursty or aperiodic traffic.

Sharing of PUR resources could be one feature to allow multiple IoT devices which have bursty traffic to make reports while remaining in an idle or inactive state which saves the UE power consumption. However, if PURs are no longer dedicated to a single UE multiple UE may simultaneously access a PUR for which there may be a contention resolution process. In particular if a UE tries to use any contention based PUR resources but is unsuccessful then a fallback method needs to be defined.

The examples described herein implement a scheme to enable contention based shared PUR for NR and the fallback mechanisms for contention resolution.

Support for contention free shared preconfigured resources (CFS PUR) has been discussed in 3GPP [R1-1906702, "Transmission in preconfigured UL resources", Nokia, Nokia Shanghai Bell, RAN1 #97, May 2019.]. The concept of contention-based resources is also described for example in the non-orthogonal multiple access (NOMA) area. However, there is no description of contention based shared PUR for NR or on mechanisms for contention resolution.

The examples provided herein describe a scheme to enable contention based shared preconfigured uplink resource (CBS PUR) for NR-Light devices.

In case of simple CBS PUR mechanism, the following steps are involved in the uplink data transmission.

UE sends the uplink data using the PUSCH allocated for CBS PUR transmission.
UE waits for ACK via explicit DCI sent using dedicated C-RNTI assigned for the UE. This C-RNTI is expected to be included in the uplink MAC PDU.
If the UE does not receive the ACK for its C-RNTI, it needs to abandon the transmission and fallback to normal RACH or EDT procedure. Otherwise the UE needs to wait for next D-PUR opportunity to send the uplink.

The above fallback mechanism may result in delay in completing the CBS PUR transmission. If the UE uses EDT or RACH transmission it may also increase the energy usage for the aperiodic emergency uplink transmissions.

In the examples described herein, the failure scenario for CBS-PUR transmission is improved with dynamic allocation of multiple resources for CBS-PUR retransmission with possibility for reduced collision.

Steps of the described examples are provided below. The UE is assigned with CBS-PURs via dedicated RRC signaling. During CBS PUR transmission, UE sends the uplink data using the PUSCH allocated for CBS PUR transmission. The UE is assigned with common RNTI for receiving DCI indicating or containing the NACK for CBS transmission in addition to the UE specific RNTI assigned for monitoring ACK. In case the gNB is able to decode the transmission from any UE in the CBS resources, it sends DCI indicating or containing ACK and scrambled with the UE-specific RNTI. The UE that is able to decode this DCI then determines that its transmission in the CBS PUR was successfully received by the gNB. In case the gNB is not able to decode any of the UE on the CBS resources, the gNB may send DCI containing or indicating NACK and scrambled with the common RNTI. The UE monitoring the NACK may use a fallback procedure for retransmission.

In one embodiment, in case the gNB is not able to decode any of the UE on the CBS resources but the received signal level is higher than a predefined or preconfigured threshold, it indicates a potential collision scenario. In this case the gNB sends DCI containing or indicating NACK and uplink grants for multiple PUSCH resources. These multiple grants are also for CBS PUSCH access for the UE which competed for access over the first CBS PUSCH resources.

In one embodiment, the NACK is implicit and given by the common RNTI. That is, UE detecting a DCI scrambled with the common RNTI may interpret this as NACK. This DCI may itself contain an uplink grant. The number of PUSCH resources may be signaled via higher-layer signaling. The gNB may determine the number of PUSCH resources based on the received signal level or on the number of detected reference signals. In one embodiment, the gNB may determine the number of PUSCH resources based on historical trends. For example, over time the gNB may learn the transmission probability for a particular group of UEs and use this information to determine the PUSCH resources needed.

In one embodiment, the DCI may indicate a delayed grant of the multiple PUSCH resources. In this case, UEs may monitor PDCCH candidate locations before the granted multiple PUSCH resources for DCI scrambled by the dedicated RNTI for an uplink PUSCH grant. If the gNB is able to detect specific reference signals, it may first provide dedicated grants to the corresponding UEs. UEs that did not receive a dedicated grant may then attempt to use the grant of multiple PUSCH resources.

In one embodiment, in case the UE receives the DCI with common RNTI, the UE randomly selects one of the multiple PUSCH resources for retransmission of PUSCH transmissions. As there are likely to be more PUSCH resources for distributing the competing UE to retransmit their PUSCH, the probability of successful completion of PUSCH transmission for all the competing UE may be higher.

In one embodiment, the gNB may send two DCIs where the first DCI scrambled with the dedicated RNTI contains ACK for the UE whose transmission it was able to decode successfully and the second DCI scrambled with the common RNTI contains NACK for all other UEs. In case the gNB detects one of the UE successfully on the PUSCH but deduces based on the total interference/signal level or the presence of other reference signal(s), the possibility of other competing UE(s), the gNB may also send NACK using common RNTI for other UE which failed the CBS access for retransmission of the PUSCH. The second DCI indicating NACK may then include allocation of multiple PUSCH resources for retransmission when the gNB determines that there may have been failed PUSCH transmissions. The UE monitors two DCIs—first DCI scrambled with dedicated RNTI for ACK and a second DCI scrambled with common RNTI for NACK. In case a UE receives ACK in the first DCI, it ignores the second DCI. In case a UE does not receive an ACK in the first DCI and receives a NACK in the second DCI, it decodes the second DCI to determine allocation of resources for retransmission. In this case also the UE which did not succeed in the CBS-PUR attempt can retransmit using these resources.

The UE attempting the PUSCH over the CBS-PUR transmission checks in two predetermined (e.g., fixed in the specification) or preconfigured (e.g., through RRC) PDCCH candidate locations for valid DCI with dedicated RNTI and common RNTI. This is to check whether the PUSCH is received at gNB or not and also whether gNB is assigning another CBS-PUR for retransmission or not. If none of the above is received, the UE may fall back to RACH or EDT transmission.

In case if the UE did not receive DCI with either common RNTI or its dedicated RNTI, it can send common preamble assigned to the CBS PUR to indicate the resources required for PUSCH retransmission. Prior to fallback to EDT, the UE can send this common preamble so that the eNB or gNB can assign TBS and resources configured for CBS-PUR instead of using EDT configuration which may not be suitable for the amount of data configured for CBS-PUR access.

Figure 3:
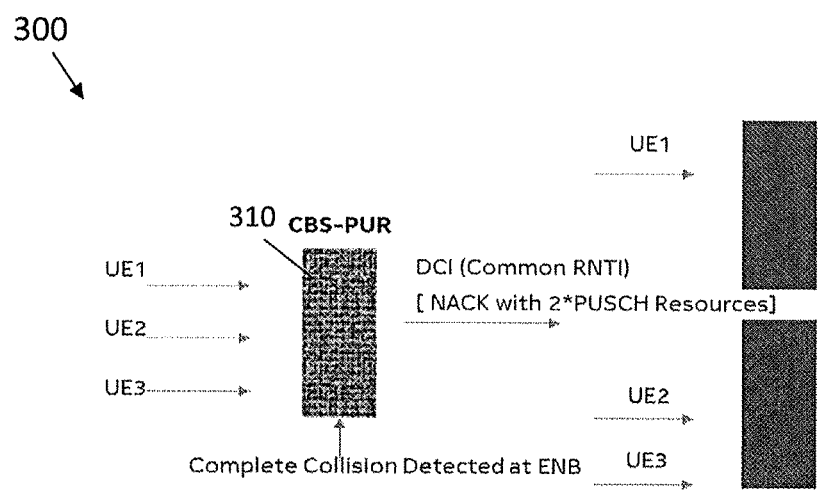
FIG. 3 is a diagram illustrating an example contention based shared preconfigured uplink resource mechanism.

FIG. 3 is a diagram 300 illustrating example steps of the described method. In FIG. 3, several UEs (UE1, UE2, and UE3) are competing for access over the first CBS PUSCH resources. In case if the UE did not receive DCI with either common RNTI or its dedicated RNTI, it can send common preamble assigned to the CBS PUR 310 to indicate the resources required for PUSCH retransmission.

Benefits of the examples described herein include enabling completion of CBS-PUR transmission for multiple UE without the UE falling back to EDT or RACH mechanism. With the help of multiple CBS-PUR resources allocated dynamically via DCI, the collision probability for CBS-PUR retransmission reduces and the overall performance for CBS-PUR transmission improves. Dynamic CBS-PUR resource allocation for retransmission from failed UE may be beneficial if a higher number of UEs are mapped to the CBS-PUR but only few of them are expected to access the CBS-PUR resources at any given instance of the CBS-PUR.

The examples described herein provide a method where the network sends NACK indicating multiple PUSCH resources for CBS retransmission in case collision is detected in the initial transmission to enable the retransmission with reduced collision probability. The examples described herein provide a method where UE attempting CBS PUR transmission monitoring common RNTI for retransmission in case of collision and also dedicated RNTI to receive HARQ-ACK and further higher layer transmission towards single UE. The examples described herein provide a method where the UE monitors for two predetermined or preconfigured PDCCH for dedicated RNTI reception and common RNTI reception. The dedicated RNTI reception may be for an acknowledgement, and the common RNTI reception may be for the negative acknowledgement. The examples described herein provide a method for a UE indicating non reception of DCI via common and dedicated RNTI via common preamble assigned for CBS to enable the ENB or gNB to send DCI with multiple CBS PUSCH resources for CBS retransmission. The examples described herein provide a method for configuration of CBS PUR retransmission with multiple resources and also the number of PUSCH allocation for retransmissions via high-layer signaling, including dedicated or common RRC signaling.

Figure 4:
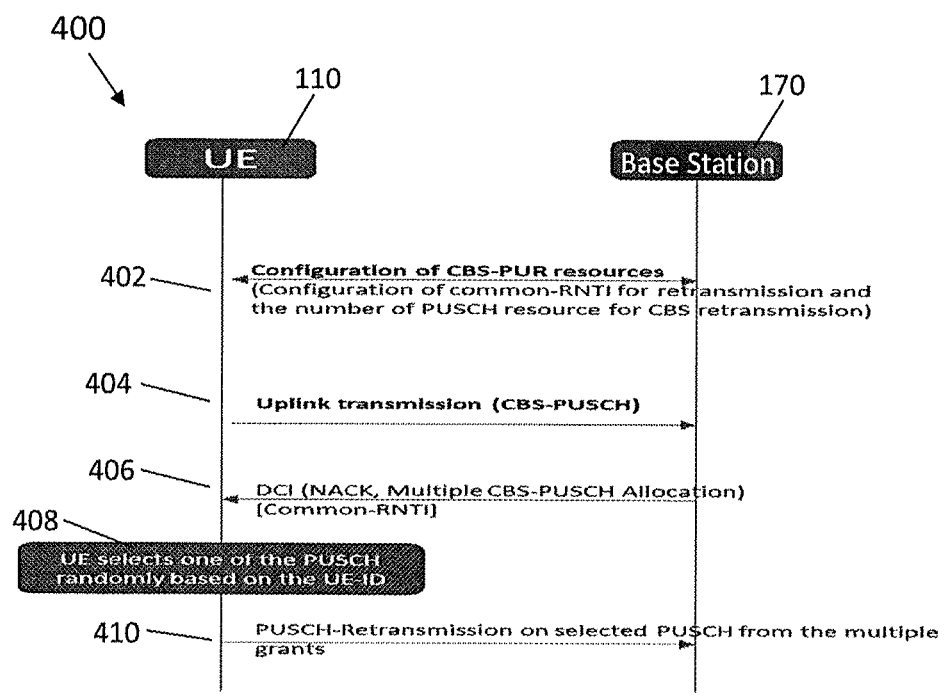
FIG. 4 is a diagram illustrating CBS retransmission with multiple grants for retransmission via DCI-NACK.
Figure 5:
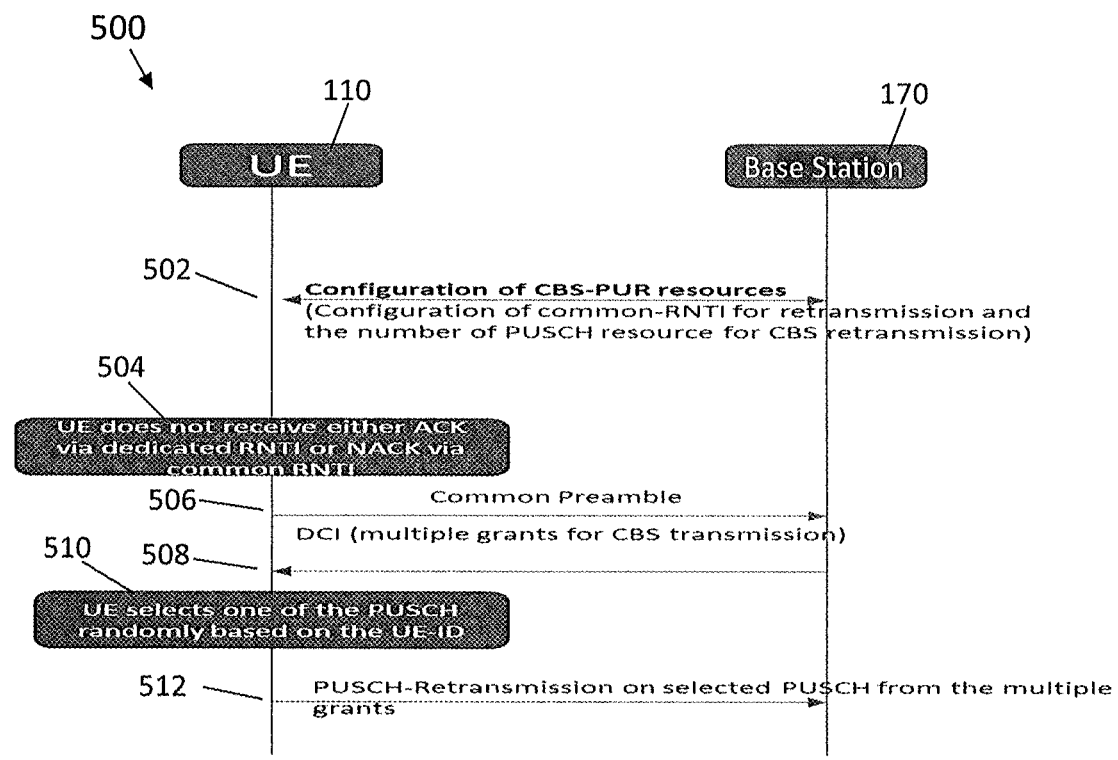
FIG. 5 is a diagram illustrating CBS retransmission triggered based on UE request via common preamble.

The message sequence diagram for the CBS PUR transmission procedure as per the described examples is illustrated by FIG. 4 and FIG. 5.

FIG. 4 illustrates the scenario 400 where the base station 170 (e.g., gNB or eNB) detects collision on the CBS PUSCH and sends NACK with multiple PUSCH resource for retransmission with reduced collision. At 402, there is configuration of CBS-PUR resources between the UE 110 and base station 170. In other words, at 402 there is configuration of common-RNTI for retransmission and the number of PUSCH resource for CBS retransmission. At 404, the UE 110 performs uplink transmission (CBS-PUSCH). At 406, the base station 170 transmits DCI (NACK, Multiple CBS-PUSCH Allocation) via a common-RNTI. At 408, the UE 110 selects one of the PUSCH randomly based on the UE-ID. At 410, the UE performs PUSCH-Retransmission on selected PUSCH from the multiple grants.

FIG. 5 illustrates scenario 500 where the base station 170 (e.g., gNB or eNB) does not detect collision but there was at least one UE (such as UE 110) which attempted CBS PUR and did not succeed. This may happen in case if the base station detection mechanism does not detect the collision accurately. In this case the UEs that failed CBS transmission send a common preamble to trigger resource allocation for retransmission. At 502, there is configuration of CBS-PUR resources between the UE 110 and base station 170. In other words, at 502 there is configuration of common-RNTI for retransmission and the number of PUSCH resource for CBS retransmission. At 504, the UE 110 does not receive either ACK via dedicated RNTI or NACK via common RNTI. At 506, the UE 110 transmits a common preamble. At 508, the UE 110 receives from the base station 170 DCI (multiple grants for CBS transmission). At 510, the UE 110 selects one of the PUSCH randomly based on the UE-ID. At 512, the UE 110 performs PUSCH-Retransmission on selected PUSCH from the multiple grants.

The examples described herein may be provided in Rel-17 standards in the NR IoT/NR-Light area, and/or may require standardization of required signaling in 3GPP.

In accordance with an example method, a method may be provided comprising: receiving an assignment of contention based shared preconfigured uplink resources via radio resource control signaling; receiving an assignment of a common radio network temporary identifier for monitoring downlink control information indicating a negative acknowledgement for contention based shared transmission, and a dedicated radio network temporary identifier for monitoring downlink control information indicating an acknowledgement of transmission of uplink data; transmitting the uplink data during a contention based shared preconfigured uplink resource transmission using a physical uplink shared channel allocated for the contention based shared preconfigured uplink resource transmission; in response to the downlink control information indicating the negative acknowledgement and uplink grants for multiple physical uplink shared channel resources, retransmitting the uplink data on a selected one of the received uplink grants for multiple physical uplink shared channel resources; and in response to the downlink control information indicating the acknowledgment, not retransmitting the uplink data.

The method may include wherein the downlink control information indicating the acknowledgement is scrambled with the dedicated radio network temporary identifier, and wherein the downlink control information indicating the negative acknowledgement is scrambled with the common radio network temporary identifier.

The method may include wherein the assignment of the common radio network temporary identifier for monitoring downlink control information indicating the negative acknowledgement for contention based shared transmission is received along with the assignment of contention based shared preconfigured uplink resources.

The method may further include monitoring the negative acknowledgement and implementing a fallback procedure for retransmission.

The method may include wherein the selection of the one of the received uplink grants for multiple physical uplink shared channel resources for the retransmitting of the uplink data is a random selection.

The method may include wherein the downlink control information indicates a delayed grant of the multiple physical uplink shared channel resources, and the method further comprises monitoring physical downlink control channel candidate locations before receiving the uplink grant for multiple contention based shared physical uplink shared channel resources.

The method may include wherein the downlink control information is monitored in a single physical downlink control channel candidate location for both the acknowledgement and the negative acknowledgement.

The method may further include monitoring, in a first physical downlink control channel candidate location, the downlink control information scrambled by the dedicated radio network temporary identifier for the acknowledgement and, in a second physical downlink control channel candidate location, the downlink control information scrambled by the common radio network temporary identifier for the negative acknowledgement.

The method may further include in response to the downlink control information being scrambled by the dedicated radio network temporary identifier indicating the acknowledgement in the first physical downlink control channel candidate location, not monitoring the downlink control information scrambled by the common radio network temporary identifier for the negative acknowledgement in the second physical downlink control channel candidate location.

The method may further include in response to not receiving the acknowledgment in the downlink control information of the first physical downlink control channel candidate location and receiving a negative acknowledgement in the downlink control information of the second physical downlink control channel candidate location, decoding the downlink control information of the second physical downlink control channel candidate location to determine allocation of resources for retransmission.

In accordance with an example method, a method may be provided comprising: configuring an assignment of contention based shared preconfigured uplink resources via radio resource control signaling for multiple user equipments; attempting to decode the contention based shared preconfigured uplink resources; in response to detecting a collision between transmissions within the contention based shared preconfigured uplink resources, transmitting the downlink control information indicating a negative acknowledgement with a common radio network temporary identifier and uplink grants for multiple physical uplink shared channel resource allocations for retransmission, and decoding the multiple physical uplink shared channel resource allocations; and in response to the transmitted uplink data being successfully decoded from at least one of the multiple user equipments within the assigned contention based shared resources, transmitting the downlink control information indicating an acknowledgement with a dedicated radio network temporary identifier.

The method may include wherein the downlink control information indicating the acknowledgement is scrambled with the dedicated radio network temporary identifier, and wherein the downlink control information indicating the negative acknowledgement is scrambled with the common radio network temporary identifier.

The method may include wherein a number of physical uplink shared channel resource allocations is determined based on at least one of a received signal level or historical trends.

The method may include wherein the physical uplink shared channel resource allocations are signaled via higher-layer signaling.

The method may include wherein the downlink control information indicates a delayed grant of the multiple physical uplink shared channel resources.

The method may include wherein the collision is detected within the contention based shared preconfigured uplink resources based on a received signal level or at least one transmitted reference signal.

The method may include wherein the downlink control information is transmitted in a single physical downlink control channel candidate location for both the acknowledgement and the negative acknowledgement The method may further include transmitting in a first physical downlink control channel candidate location, the downlink control information scrambled by the dedicated radio network temporary identifier for the acknowledgement and/or, transmitting in a second physical downlink control channel candidate location, the downlink control information scrambled by the common radio network temporary identifier for the negative acknowledgement.

The method may further include transmitting the downlink control information scrambled by the dedicated radio network temporary identifier indicating the acknowledgement in the first physical downlink control channel candidate location, and not transmitting the downlink control information scrambled by the common radio network temporary identifier for the negative acknowledgement in the second physical downlink control channel candidate location.

The method may further include not transmitting the acknowledgment in the downlink control information of the first physical downlink control channel candidate location, and transmitting the negative acknowledgement in the downlink control information of the second physical downlink control channel candidate location and uplink grants for multiple physical uplink shared channel resource allocations for retransmission, and decoding the multiple physical uplink shared channel resource allocations.

The method may include wherein the collision is detected based on the transmitted uplink data being successfully decoded from at least one of the multiple user equipments within the assigned contention based shared resources but deducing based on a total interference or received signal level or the presence of at least one other reference signal, the possibility of at least one other user equipment competing for the contention based shared preconfigured uplink resources.

The method may further include receiving a retransmitting of uplink data on one of the transmitted uplink grants for multiple physical uplink shared channel resource allocations for retransmission.

The method may include wherein an assignment of the common radio network temporary identifier is provided along with the assignment of contention based shared preconfigured uplink resources.

The method may further include transmitting an assignment of the common radio network temporary identifier, and the dedicated radio network temporary identifier.

In accordance with an example apparatus, an apparatus may be provided comprising: at least one processor; and at least one non-transitory memory including computer program code, the at least one memory and the computer program code configured to, with the at least one processor, cause the apparatus to: receive an assignment of contention based shared preconfigured uplink resources via radio resource control signaling; receive an assignment of a common radio network temporary identifier for monitoring downlink control information indicating a negative acknowledgement for contention based shared transmission, and a dedicated radio network temporary identifier for monitoring downlink control information indicating an acknowledgement of transmission of uplink data; transmit the uplink data during a contention based shared preconfigured uplink resource transmission using a physical uplink shared channel allocated for the contention based shared preconfigured uplink resource transmission; in response to the downlink control information indicating the negative acknowledgement and uplink grants for multiple physical uplink shared channel resources, retransmit the uplink data on a selected one of the received uplink grants for multiple physical uplink shared channel resources; and in response to the downlink control information indicating the acknowledgment, not retransmit the uplink data.

In accordance with an example apparatus, an apparatus may be provided comprising at least one processor; and at least one non-transitory memory including computer program code, the at least one memory and the computer program code configured to, with the at least one processor, cause the apparatus to: configure an assignment of contention based shared preconfigured uplink resources via radio resource control signaling for multiple user equipments; attempt to decode the contention based shared preconfigured uplink resources; in response to detecting a collision between transmissions within the contention based shared preconfigured uplink resources, transmit the downlink control information indicating a negative acknowledgement with a common radio network temporary identifier and uplink grants for multiple physical uplink shared channel resource allocations for retransmission, and decode the multiple physical uplink shared channel resource allocations; and in response to the transmitted uplink data being successfully decoded from at least one of the multiple user equipments within the assigned contention based shared resources, transmit the downlink control information indicating an acknowledgement with a dedicated radio network temporary identifier.

In accordance with an example non-transitory program storage device, a non-transitory program storage device readable by a machine, tangibly embodying a program of instructions executable by the machine for performing operations may be provided, the operations comprising: receiving an assignment of contention based shared preconfigured uplink resources via radio resource control signaling; receiving an assignment of a common radio network temporary identifier for monitoring downlink control information indicating a negative acknowledgement for contention based shared transmission, and a dedicated radio network temporary identifier for monitoring downlink control information indicating an acknowledgement of transmission of uplink data; transmitting the uplink data during a contention based shared preconfigured uplink resource transmission using a physical uplink shared channel allocated for the contention based shared preconfigured uplink resource transmission; in response to the downlink control information indicating the negative acknowledgement and uplink grants for multiple physical uplink shared channel resources, retransmitting the uplink data on a selected one of the received uplink grants for multiple physical uplink shared channel resources; and in response to the downlink control information indicating the acknowledgment, not retransmitting the uplink data.

In accordance with an example non-transitory program storage device, a non-transitory program storage device readable by a machine, tangibly embodying a program of instructions executable by the machine for performing operations may be provided, the operations comprising configuring an assignment of contention based shared preconfigured uplink resources via radio resource control signaling for multiple user equipments; attempting to decode the contention based shared preconfigured uplink resources; in response to detecting a collision between transmissions within the contention based shared preconfigured uplink resources, transmitting the downlink control information indicating a negative acknowledgement with a common radio network temporary identifier and uplink grants for multiple physical uplink shared channel resource allocations for retransmission, and decoding the multiple physical uplink shared channel resource allocations; and in response to the transmitted uplink data being successfully decoded from at least one of the multiple user equipments within the assigned contention based shared resources, transmitting the downlink control information indicating an acknowledgement with a dedicated radio network temporary identifier.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A method comprising:
 receiving an assignment of contention based shared preconfigured uplink resources via radio resource control signaling;
 receiving an assignment of a common radio network temporary identifier for monitoring downlink control information indicating a negative acknowledgement for contention based shared transmission, and a dedicated radio network temporary identifier for monitoring downlink control information indicating an acknowledgement of transmission of uplink data;

transmitting the uplink data during a contention based shared preconfigured uplink resource transmission using a physical uplink shared channel allocated for the contention based shared preconfigured uplink resource transmission;

in response to the downlink control information indicating the negative acknowledgement and uplink grants for multiple physical uplink shared channel resources, retransmitting the uplink data on a selected one of the received uplink grants for multiple physical uplink shared channel resources; and in response to the downlink control information indicating the acknowledgment, not retransmitting the uplink data.

2. The method of claim 1, wherein the downlink control information indicating the acknowledgement is scrambled with the dedicated radio network temporary identifier, and wherein the downlink control information indicating the negative acknowledgement is scrambled with the common radio network temporary identifier.

3. The method of claim 1, wherein the assignment of the common radio network temporary identifier for monitoring downlink control information indicating the negative acknowledgement for contention based shared transmission is received along with the assignment of contention based shared preconfigured uplink resources.

4. The method of claim 1, further comprising monitoring the negative acknowledgement and implementing a fallback procedure for retransmission.

5. The method of claim 1, wherein the selection of the one of the received uplink grants for multiple physical uplink shared channel resources for the retransmitting of the uplink data is a random selection.

6. The method of claim 1, wherein the downlink control information indicates a delayed grant of the multiple physical uplink shared channel resources, and the method further comprises monitoring physical downlink control channel candidate locations before receiving the uplink grant for multiple contention based shared physical uplink shared channel resources.

7. The method of claim 1, wherein the downlink control information is monitored in a single physical downlink control channel candidate location for both the acknowledgement and the negative acknowledgement.

8. The method of claim 1, further comprising monitoring, in a first physical downlink control channel candidate location, the downlink control information scrambled by the dedicated radio network temporary identifier for the acknowledgement and, in a second physical downlink control channel candidate location, the downlink control information scrambled by the common radio network temporary identifier for the negative acknowledgement.

9. The method of claim 8, further comprising: in response to the downlink control information being scrambled by the dedicated radio network temporary identifier indicating the acknowledgement in the first physical downlink control channel candidate location, not monitoring the downlink control information scrambled by the common radio network temporary identifier for the negative acknowledgement in the second physical downlink control channel candidate location.

10. The method of claim 8, further comprising: in response to not receiving the acknowledgment in the downlink control information of the first physical downlink control channel candidate location and receiving a negative acknowledgement in the downlink control information of the second physical downlink control channel candidate location, decoding the downlink control information of the second physical downlink control channel candidate location to determine allocation of resources for retransmission.

11. A method comprising:
configuring an assignment of contention based shared preconfigured uplink resources via radio resource control signaling for multiple user equipments;
attempting to decode the contention based shared preconfigured uplink resources;
in response to detecting a collision between transmissions within the contention based shared preconfigured uplink resources, transmitting the downlink control information indicating a negative acknowledgement with a common radio network temporary identifier and uplink grants for multiple physical uplink shared channel resource allocations for retransmission, and decoding the multiple physical uplink shared channel resource allocations; and
in response to the transmitted uplink data being successfully decoded from at least one of the multiple user equipments within the assigned contention based shared resources, transmitting the downlink control information indicating an acknowledgement with a dedicated radio network temporary identifier.

12. The method of claim 11, wherein the downlink control information indicating the acknowledgement is scrambled with the dedicated radio network temporary identifier, and wherein the downlink control information indicating the negative acknowledgement is scrambled with the common radio network temporary identifier.

13. The method of claim 11, wherein a number of physical uplink shared channel resource allocations is determined based on at least one of a received signal level or historical trends.

14. The method of claim 11, wherein the physical uplink shared channel resource allocations are signaled via higher-layer signaling.

15. The method of claim 11, wherein the downlink control information indicates a delayed grant of the multiple physical uplink shared channel resources.

16. The method of claim 11, wherein the collision is detected within the contention based shared preconfigured uplink resources based on a received signal level or at least one transmitted reference signal.

17. The method of claim 11, wherein the downlink control information is transmitted in a single physical downlink control channel candidate location for both the acknowledgement and the negative acknowledgement.

18. The method of claim 11, further comprising transmitting in a first physical downlink control channel candidate location, the downlink control information scrambled by the dedicated radio network temporary identifier for the acknowledgement and/or, transmitting in a second physical downlink control channel candidate location, the downlink control information scrambled by the common radio network temporary identifier for the negative acknowledgement.

19. The method of claim 18, further comprising transmitting the downlink control information scrambled by the dedicated radio network temporary identifier indicating the acknowledgement in the first physical downlink control channel candidate location, and not transmitting the downlink control information scrambled by the common radio network temporary identifier for the negative acknowledgement in the second physical downlink control channel candidate location.

20. The method of claim 18, further comprising not transmitting the acknowledgment in the downlink control information of the first physical downlink control channel candidate location, and transmitting the negative acknowledgement in the downlink control information of the second physical downlink control channel candidate location and uplink grants for multiple physical uplink shared channel resource allocations for retransmission, and decoding the multiple physical uplink shared channel resource allocations.

21. The method of claim 11, wherein the collision is detected based on the transmitted uplink data being successfully decoded from at least one of the multiple user equipments within the assigned contention based shared resources but deducing based on a total interference or received signal level or the presence of at least one other reference signal, the possibility of at least one other user equipment competing for the contention based shared preconfigured uplink resources.

22. The method of claim 11, further comprising receiving a retransmitting of uplink data on one of the transmitted uplink grants for multiple physical uplink shared channel resource allocations for retransmission.

23. The method of claim 11, wherein an assignment of the common radio network temporary identifier is provided along with the assignment of contention based shared preconfigured uplink resources.

24. The method of claim 11, further comprising transmitting an assignment of the common radio network temporary identifier, and the dedicated radio network temporary identifier.

25. An apparatus comprising:
at least one processor; and
at least one non-transitory memory including computer program code, the at least one memory and the computer program code configured to, with the at least one processor, cause the apparatus to:
receive an assignment of contention based shared preconfigured uplink resources via radio resource control signaling;
receive an assignment of a common radio network temporary identifier for monitoring downlink control information indicating a negative acknowledgement for contention based shared transmission, and a dedicated radio network temporary identifier for monitoring downlink control information indicating an acknowledgement of transmission of uplink data;
transmit the uplink data during a contention based shared preconfigured uplink resource transmission using a physical uplink shared channel allocated for the contention based shared preconfigured uplink resource transmission;
in response to the downlink control information indicating the negative acknowledgement and uplink grants for multiple physical uplink shared channel resources, retransmit the uplink data on a selected one of the received uplink grants for multiple physical uplink shared channel resources; and
in response to the downlink control information indicating the acknowledgment, not retransmit the uplink data.

26. An apparatus comprising:
at least one processor; and
at least one non-transitory memory including computer program code, the at least one memory and the computer program code configured to, with the at least one processor, cause the apparatus to:
configure an assignment of contention based shared preconfigured uplink resources via radio resource control signaling for multiple user equipments;
attempt to decode the contention based shared preconfigured uplink resources;
in response to detecting a collision between transmissions within the contention based shared preconfigured uplink resources, transmit the downlink control information indicating a negative acknowledgement with a common radio network temporary identifier and uplink grants for multiple physical uplink shared channel resource allocations for retransmission, and decode the multiple physical uplink shared channel resource allocations; and
in response to the transmitted uplink data being successfully decoded from at least one of the multiple user equipments within the assigned contention based shared resources, transmit the downlink control information indicating an acknowledgement with a dedicated radio network temporary identifier.

27. A non-transitory program storage device readable by a machine, tangibly embodying a program of instructions executable by the machine for performing operations, the operations comprising:
receiving an assignment of contention based shared preconfigured uplink resources via radio resource control signaling;
receiving an assignment of a common radio network temporary identifier for monitoring downlink control information indicating a negative acknowledgement for contention based shared transmission, and a dedicated radio network temporary identifier for monitoring downlink control information indicating an acknowledgement of transmission of uplink data;
transmitting the uplink data during a contention based shared preconfigured uplink resource transmission using a physical uplink shared channel allocated for the contention based shared preconfigured uplink resource transmission;
in response to the downlink control information indicating the negative acknowledgement and uplink grants for multiple physical uplink shared channel resources, retransmitting the uplink data on a selected one of the received uplink grants for multiple physical uplink shared channel resources; and
in response to the downlink control information indicating the acknowledgment, not retransmitting the uplink data.

28. A non-transitory program storage device readable by a machine, tangibly embodying a program of instructions executable by the machine for performing operations, the operations comprising:
configuring an assignment of contention based shared preconfigured uplink resources via radio resource control signaling for multiple user equipments;
attempting to decode the contention based shared preconfigured uplink resources;
in response to detecting a collision between transmissions within the contention based shared preconfigured uplink resources, transmitting the downlink control information indicating a negative acknowledgement with a common radio network temporary identifier and uplink grants for multiple physical uplink shared channel resource allocations for retransmission, and decoding the multiple physical uplink shared channel resource allocations; and in response to the transmitted uplink data being successfully decoded from at least one of the multiple user equipments within the assigned contention based shared resources, transmitting the downlink control information indicating an acknowledgement with a dedicated radio network temporary identifier.

* * * * *